J. B. HANLEY.
RESILIENT VEHICLE WHEEL.
APPLICATION FILED FEB. 27, 1920.

1,374,651.

Patented Apr. 12, 1921.
2 SHEETS—SHEET 1.

Witnesses
W. C. Fielding.
Augustus Clopper

Inventor
James B. Hanley
By Joshua R. H. Potts
His Attorney

NORRIS PETERS, INC., LITHO., WASHINGTON, D. C.

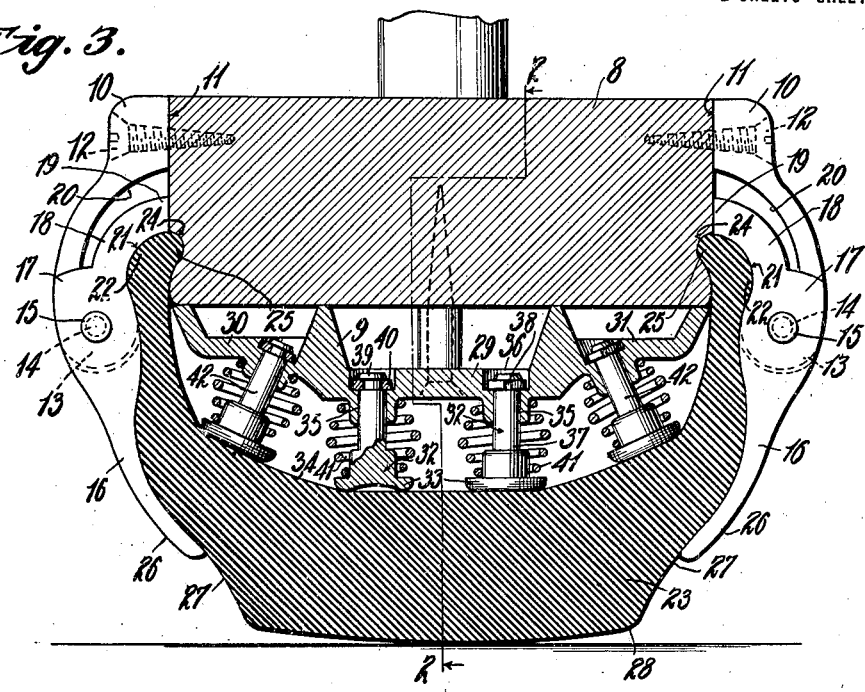
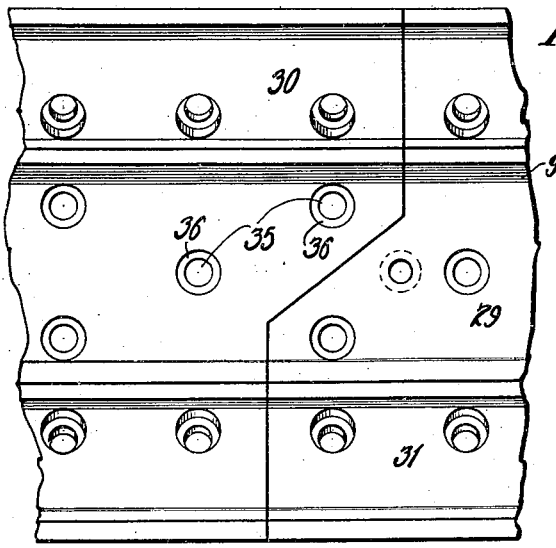
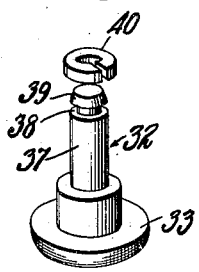

UNITED STATES PATENT OFFICE.

JAMES B. HANLEY, OF PHILADELPHIA, PENNSYLVANIA.

RESILIENT VEHICLE-WHEEL.

1,374,651.	Specification of Letters Patent.	Patented Apr. 12, 1921.

Application filed February 27, 1920. Serial No. 361,855.

*To all whom it may concern:*

Be it known that I, JAMES B. HANLEY, a citizen of the United States, residing at Philadelphia, in the county of Philadelphia and State of Pennsylvania, have invented certain new and useful Improvements in Resilient Vehicle-Wheels, of which the following is a specification.

One object of my invention is to provide an improved resilient vehicle wheel which will serve to efficiently absorb shocks caused by the movement of a vehicle over a roadway.

Another object is to make my improved vehicle wheel in such manner that it will be durable and of a strong construction; thereby rendering it applicable for vehicles carrying heavy loads.

These objects, and other advantageous ends which will be described hereinafter, I attain in the following manner, reference being had to the accompanying drawings in which—

Figure 1:
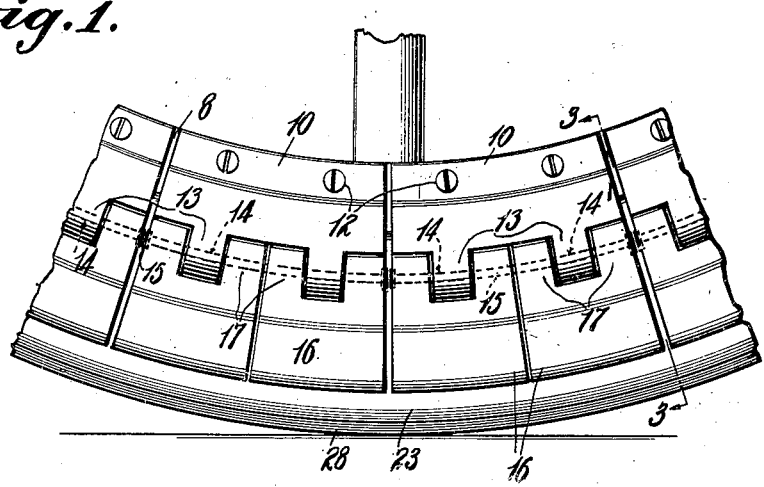
Figure 2:
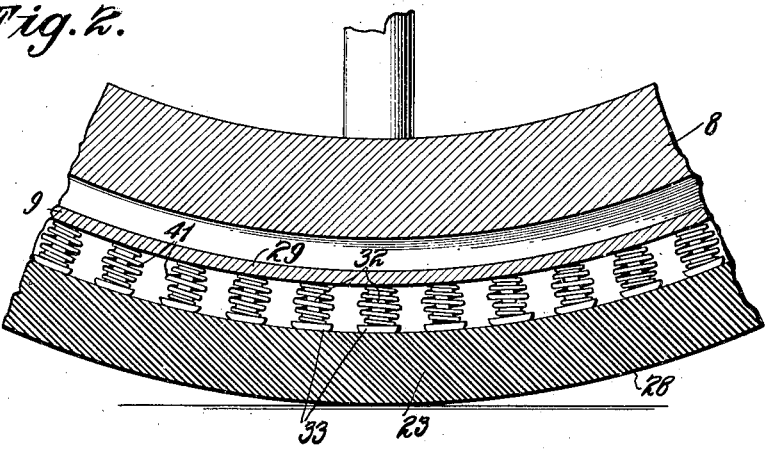
Figures 6, 7:
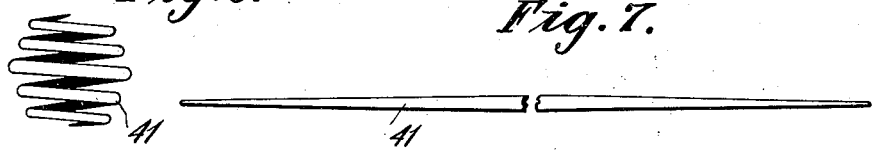

Figure 1 is a fragmentary elevation of a portion of a vehicle wheel made in accordance with my invention, Fig. 2 is a fragmentary longitudinal sectional view taken on the line 2—2 of Fig. 3 and drawn on the same scale as Fig. 1, Fig. 3 is an enlarged transverse section taken on the line 3—3 of Fig. 1 and drawn on a larger scale, Fig. 4 is a fragmentary plan view of a portion of a rim, which forms a part of my invention, viewed from the inside, Fig. 5 is a detached perspective view showing one of a number of spring-pressed plungers which form a part of my invention, Fig. 6 is an elevational view of one of a number of springs which I preferably employ in connection with the plunger shown in Fig. 5, and Fig. 7 is a developed view showing the tapered character of a wire from which the spring of Fig. 6 is made.

Referring to the drawings my invention includes a wheel felly 8 to which is secured a metallic rim 9, said rim being preferably split transversely as shown in Fig. 4. A number of metallic brackets 10 are detachably secured to the opposite sides 11 of the felly by screws 12. These brackets, as clearly shown in Figs. 1 and 3, are arranged in annular formation, independently, and each of the brackets includes two extensions or tongues 13 which are spaced apart and provided with holes 14 through which a pivot pin 15 extends. Two latches 16 are pivotally secured to each bracket 10; each of said latches being yoked and provided with fingers 17 which have holes through which the pivot pin 15 extends; said fingers of each latch spanning the tongue 13 of a respective bracket as clearly shown in Fig. 1. The fingers 17 on the outside, as clearly shown in Fig. 3, are normally flush with the outer surface of the brackets 10; said surface of the brackets and the adjacent surfaces of the fingers being curved outwardly.

The portions 18 of the fingers 17 have inner ends 19 normally positioned adjacent the side surfaces 11 of the felly 8. These portions 18 of the fingers 17 are adapted to swing within the space provided by the concave surfaces 20 of the brackets 10 and the sides of the felly 8 and the inner surface 21 of the portions 18 of the fingers 17 are curved inwardly and adapted to engage outwardly swelled portions or beads 22 of a rubber tire shoe 23. The side surfaces 11 of the felly 8 are grooved as shown at 24 and inwardly swelled parts 25 of the tire shoe 23 fit within these grooves 24. The latches 16 have arms 26 which fit against the outer surface 27 of the tire shoe 23 so that the pivot pins 15 are positioned between the swelled portions of the tire shoe bead and the tread portion 28 of said tire shoe.

The inner surface of the rim 9 has an annularly extending central channel 29 and two other channels 30 and 31 which are positioned to the side of the channel 29, as clearly shown in Figs. 3 and 4. Plungers 32 are slidable through holes in the rim 9 and have cupped heads 33 adapted to engage the inner surface 34 of the tire shoe 23. The holes 35, through which the plungers 32 slide, communicate with comparatively large cavities 36 leading in from the channel 29; said plungers being substantially parallel to the plane of rotatable movement of the wheel and being radially disposed as clearly shown in Fig. 2.

The stems 37 of the plungers are grooved adjacent their free ends as shown at 38; said free ends being tapered outwardly as at 39 to permit the insertion of split retaining rings 40 within the grooves 38 to limit the outward movement of the plungers; it being noted that the retaining rings, as shown in Fig. 3, engage the inner surfaces of the cavities 36 and thereby prevent further outward movement of said plungers. Coiled springs 41 are interposed between the cupped heads 33 and the rim 9 to form a resilient backing for the plunger heads; said springs being made of wire which tapers toward the ends so that the innermost coils of the springs are thicker than the end coils. A resilient but durable backing is thus provided for the plungers. Other plungers 42, which are constructed in the same manner as the plungers 32, extend at a slant through holes communicating with the channels 30 and 31; the cupped heads engaging the side portions of the inner surface 34 at a slant to the horizontal as clearly shown in Fig. 3. Thus the plungers 42 are capable of movement when any side pressure is placed upon the side of the tire shoe 23 so that while the plungers 32 and their springs will take care of pressures effected in the plane of rotatable movement, the plungers 42 and their springs will absorb shocks caused by pressures imparted laterally against the sides of the tire shoe.

By pivotally mounting the latches 16 and providing the arms 26, a durable yet flexible side armor is provided for the sides of the tire shoe. The resilient characteristics of the tire shoe serves to normally hold the latches in the positions such for example as shown in Fig. 3 and when the latches are moved, such for example as when the arms 26 encounter any obstacles in the roadway, the movement of said latches is against the cushioning effect of the sides of the tire shoe. Thus the latches serve as retaining means for the sides of the tire shoe and also serve as yieldable protective armor therefor.

It will be noted that by arranging the pivot pins as illustrated, when the arms 26 are moved inwardly the portions 18 of the fingers 17 will be moved outwardly to allow expansion of the beaded portion where other portions of the tire shoe engaged by the arms 26 and the roadway are compressed. The tire shoe may be made of solid rubber or reinforced rubber and the springs and the plungers, which are disposed within the tire shoe, serve as yieldable means for absorbing the shocks caused by the movement of a wheel over a roadway; said latches also being movable on their pivot pins to permit any necessary movement to the sides of the tire shoe as is obvious from the above construction.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination in a wheel of a felly; a resilient tire shoe having beads extending adjacent the opposite sides of the felly; brackets secured to said sides of the felly; and latches pivotally connected to said brackets and engaging the sides of said tire shoe; substantially as described.

2. The combination in a wheel of a felly; a resilient tire shoe having beads extending adjacent the opposite sides of the felly; brackets secured to said sides of the felly; latches pivotally connected to said brackets and engaging the sides of said tire shoe, said latches being pivotally mounted between their ends whereby fingers are provided for engagement with the beads of the tire shoe; and arms are provided for engagement with the sides of the tire shoe between the beads and the tread; substantially as described.

3. The combination in a wheel of a felly; a resilient tire shoe having beads extending adjacent the opposite sides of the felly; latches being pivotally mounted between their ends providing fingers for engagement with the outer portions of said beads of the tire shoe; and arms for engagement with the side portions of the tire shoe between the beads and the tread; substantially as described.

4. The combination in a wheel of a felly; a tire shoe having beads extending adjacent the opposite sides of the felly; latches being pivotally mounted between their ends providing fingers for engagement with the outer portions of said beads of the tire shoe; arms for engagement with the side portions of the tire shoe between the beads and the tread; and means resiliently movable against the inner surface of said tire shoe to compress the latter against said arms whereby said latches are swung to normally move and hold said fingers in clamping engagement with the beads; substantially as described.

5. The combination in a wheel of a felly; a tire shoe having beads extending adjacent the opposite sides of the felly; latches being pivotally mounted between their ends providing fingers for engagement with the outer portions of said beads of the tire shoe; arms for engagement with the side portions of the tire shoe between the beads and the tread; a rim on said felly within said tire shoe; and spring-pressed plungers slidably connected to said rim and adapted to bear against the inner surface of said tire shoe, certain of said plungers tending to press said tire shoe against the arms of said latches whereby the latter are swung to move the fingers in clamping engagement with the beads of the tire shoe; substantially as described.

6. A wheel including a tire shoe; a rim positioned within the tire shoe and having holes therein; plungers slidable through the rim and having heads for engagement with the inner surface of the tire shoe; cushioning springs for said plungers, said plungers having grooves and outwardly tapering ends opposite said heads; and split retaining rings fitting said grooves for abutment with said rim to limit the outward movement of said plungers, said tapering ends of the plungers being adapted when inserted through the holes of the rings to spread the latter to permit the rings to engage within the grooves; substantially as described.

In testimony whereof I have signed my name to this specification in the presence of two subscribing witnesses.

JAMES B. HANLEY.

Witnesses:
ANNA RENTON,
CHAS. E. POTTS.